(12) United States Patent
D'Alesio (10) Patent No.: US 11,858,225 B2
(45) Date of Patent: Jan. 2, 2024

(54) PULTRUDED STRIPS

(71) Applicant: Vestas Wind Systems A/S, Aarhus N. (DK)

(72) Inventor: Alessio D'Alesio, Ryde (GB)

(73) Assignee: Vestas Wind Systems A/S, Aarhus (DK)

(*) Notice: Subject to any disclaimer, the term of this patent is extended or adjusted under 35 U.S.C. 154(b) by 832 days.

(21) Appl. No.: 16/607,786

(22) PCT Filed: May 8, 2018

(86) PCT No.: PCT/DK2018/050099
§ 371 (c)(1),
(2) Date: Oct. 24, 2019

(87) PCT Pub. No.: WO2018/206068
PCT Pub. Date: Nov. 15, 2018

(65) Prior Publication Data
US 2020/0094442 A1    Mar. 26, 2020

(30) Foreign Application Priority Data

May 9, 2017    (DK) .......................... PA 2017 70324

(51) Int. Cl.
*B29C 70/00* (2006.01)
*B29B 11/00* (2006.01)
(Continued)

(52) U.S. Cl.
CPC ............ *B29C 70/521* (2013.01); *B29B 11/06* (2013.01); *B29B 11/16* (2013.01);
(Continued)

(58) Field of Classification Search
CPC ......... B29C 70/00; B29C 70/50; B29C 70/52; B29C 70/521; B29B 11/00; B29B 11/06;
(Continued)

(56) References Cited

U.S. PATENT DOCUMENTS

2016/0167259 A1    6/2016    Plagemann et al.
2017/0082089 A1*   3/2017    Yarbrough .............. F03D 13/10

FOREIGN PATENT DOCUMENTS

CA    2516878 A1    2/2006
CN    102179943 A   9/2011
(Continued)

OTHER PUBLICATIONS

Danish Patent and Trademark Office, Search and Exam Report in PA 2017 70324, dated Sep. 27, 2017.
(Continued)

*Primary Examiner* — Jacob T Minskey
*Assistant Examiner* — Matthew Hoover
(74) *Attorney, Agent, or Firm* — Wood Herron & Evans LLP (57) ABSTRACT

A pultruded strip (50) of reinforcing material for stacking with one or more similar strips (50) to form a spar cap for a wind turbine blade is disclosed. The pultruded strip comprises a core (56) comprising fibres (58) disposed in a resin matrix (60) and a sacrificial layer (52) at least partially covering one or more surfaces of the core (56). The sacrificial layer (52) is a resin layer defining an adherend surface (62A) of the strip. A pultrusion process for making such a strip (50) comprises drawing resin-coated reinforcing fibres (58) through a pultrusion die (80) in a process direction to form a core (56) of the strip (50) and applying further resin (53) to one or more surfaces of the core (56) to form a sacrificial resin layer (52) defining an adherend surface (62A) of the strip (50).

16 Claims, 7 Drawing Sheets (51) Int. Cl.
- *B29D 99/00* (2010.01)
- *F03D 1/00* (2006.01)
- *B29C 70/52* (2006.01)
- *B29B 11/06* (2006.01)
- *B29B 11/16* (2006.01)
- *F03D 1/06* (2006.01)
- *B29K 63/00* (2006.01)
- *B29K 307/04* (2006.01)

(52) U.S. Cl.
CPC ....... *B29D 99/0003* (2013.01); *F03D 1/0675* (2013.01); *B29K 2063/00* (2013.01); *B29K 2307/04* (2013.01)

(58) Field of Classification Search
CPC ......... B29B 11/10; B29B 11/16; B29D 99/00; B29D 99/0003; F03D 1/00; F03D 1/06; F03D 1/067; F03D 1/0675
See application file for complete search history.

(56) References Cited

FOREIGN PATENT DOCUMENTS

| | | |
|---|---|---|
| CN | 105848860 A | 8/2016 |
| CN | 105881936 A | 8/2016 |
| EP | 1754589 A1 | 2/2007 |
| WO | 2014079456 A1 | 5/2014 |
| WO | WO-2014079456 A1 * | 5/2014 ............ B29C 65/70 |
| WO | 2015058775 A1 | 4/2015 |

OTHER PUBLICATIONS

European Patent Office, International Search Report and Written Opinion in PCT Application No. PCT/DK2018/0500pp, dated Jul. 16, 2018.

China National Intellectual Property Administration, First Notification of Office Action in CN Application No. 201880030547.2, dated Feb. 1, 2021.

European Patent Office, Examination Report in EP Application No. 18725392.7, dated May 24, 2022.

European Patent Office, result of consultation issued in corresponding EP Application No. 18725392.7, dated Apr. 26, 2023.

* cited by examiner

PULTRUDED STRIPS

TECHNICAL FIELD

The present invention relates to pultruded strips such as those used in reinforcing elements in wind turbine blades and to methods and apparatus for making such strips. In particular embodiments of the invention, a plurality of pultruded strips are used to form a spar cap for a wind turbine blade.

BACKGROUND

Pultruded strips typically contain structural fibres such as carbon fibres extending along the length of the strip and suspended in a matrix material such as a resin. Pultruded strips have a high tensile strength, and hence have a high load bearing capacity. Such strips may be stacked on top of one another and bonded together to form a laminate component having structural properties suitable for strengthening a wind turbine blade, for example as a spar cap.

To form a spar cap, for example, a stack of pultruded strips may be bonded together using an adhesive such as resin. A resin infusion process may be used, in which liquid resin is infused between the stacked strips. The strips may be generally rectangular in cross section, and have upper and lower adherend surfaces bonded to similar adherend surfaces of adjacent strips in the stack.

The pultrusion process generally results in strips having very smooth glass-like adherend surfaces. However, it is difficult to bond such smooth surfaces together, because the resin does not tend to adhere well to these smooth surfaces. Also, when the strips are stacked there is little space for resin to penetrate between opposed smooth surfaces of adjacent strips. Accordingly, prior to bonding the strips together, the adherend surfaces may be activated, for example by mild abrasion. However, a problem with abrasion is that it tends to damage the reinforcing fibres at the surface of the strip.

An alternative is to form the pultruded strips with an integral peel ply layer at the surface of the strip. The peel ply is removed from the strips prior to stacking the strips. When the peel ply is removed, the resulting strip has a rough surface. However, peel ply introduces additional challenges. For example, it may become caught in the pultrusion die during the pultrusion process, and it can also cause damage to the fibres once removed. It also increases the cost of the pultrusion process.

Against this background, it is an object of the invention to mitigate or overcome some or all of the problems described above.

SUMMARY

In accordance with the present invention, there is provided a pultrusion process for making a pultruded strip suitable for stacking with one or more similar strips to form a spar cap for a wind turbine blade. The process comprises drawing resin-coated reinforcing fibres through a pultrusion die in a process direction to form a core of the strip and applying further resin to one or more surfaces of the core to form a sacrificial resin layer defining an adherend surface of the strip.

The pultrusion process may further comprise removing resin from the sacrificial layer to activate the adherend surface. Any suitable technique may be used to remove resin from the sacrificial. Suitable techniques include: abrasion, blasting treatments and energetic surface treatments. Activation of the adherend surface results in a rough surface, at least on a microscopic or molecular level. In embodiments, activation of the adherend surfaces may be performed at a later stage and/or at a separate location to the pultrusion process. For example, the strips may be activated immediately prior to bonding to each other to avoid contamination of the adherend surfaces.

The method preferably comprises curing the further resin prior to removing cured resin from the sacrificial layer.

The method may comprise removing cured resin from the sacrificial layer at an activation station provided inline with the pultrusion die. Alternatively, the cured resin may be removed from the sacrificial layer at a later time, i.e. in a separate process after completion of the pultrusion process.

The pultrusion process according to any of the embodiments above may further comprise at least partially curing the resin in the core of the strip before applying the further resin.

The method may comprise fully curing the resin in the core and the sacrificial resin at the same time. A curing oven may be provided in-line with the pultrusion die. Alternatively or additionally the pultrusion die may be configured to partially or fully cure the resin.

The pultrusion die preferably has a substantially rectangular cross-section. The resin-coated fibres may therefore be shaped by the die to form a core having a substantially rectangular cross-section.

The pultrusion process according to any of the embodiments above may comprise applying the further resin downstream of the pultrusion die in the process direction. Any suitable technique may be used to apply the further resin. For example, the further resin may be applied by drawing the core of the strip through a bath containing the further resin. The further resin may be applied to the core using rollers, or the further resin may be sprayed onto the core.

The method may comprise applying the further resin to mutually opposed first and second surfaces of the core.

The method may comprise applying the further resin such that it substantially covers the core of the strip.

The method may comprise drawing the core with the applied further resin through a further pultrusion die to form the strip into a final cross-sectional shape. Accordingly, the pultrusion apparatus may comprise first and second pultrusion dies spaced apart in the process direction. The method may comprise applying the further resin to the core at a position between the first and second pultrusion dies.

As an alternative to having first and second pultrusion dies, the process may be performed using a single die. The method may therefore comprise applying the further resin inside the pultrusion die.

The pultrusion process according to any of the above mentioned embodiments may further comprise shaping the core of the strip in a first portion of the die and shaping the core and sacrificial layer in a second portion of the die, wherein the method comprises applying the further resin to the core within the die between the first and second portions of the die.

The first portion of the die may comprise mutually-opposed first and second surfaces spaced apart by a first distance perpendicular to the process direction. The second portion of the die may comprise mutually-opposed first and second surfaces spaced apart by a second distance perpendicular to the process direction. The second distance may be greater than the first distance. The distance between the first and second surfaces may define the thickness of the strip. Accordingly, the thickness of the strip (including sacrificial layer) shaped by the second portion of the die is greater than the thickness of the core shaped by the first portion of the die.

Also in accordance with the present invention, there is provided a pultruded strip of reinforcing material for stacking with one or more similar strips to form a spar cap for a wind turbine blade.

The pultruded strip comprises a core comprising fibres disposed in a resin matrix and a sacrificial layer at least partially covering one or more surfaces of the core. The sacrificial layer is a resin layer defining an adherend surface of the strip.

The sacrificial layer may have an activated adherend surface formed by removal of resin from the sacrificial layer.

The resin may be removed by any suitable means, for example abrasion, blasting treatments or energetic surface treatments.

The sacrificial layer may be substantially devoid of fibres. For example, the sacrificial layer may have a fibre volume fraction of less than 10%, such as less than 2% or 0%.

The sacrificial layer may have a thickness in the range of 0.1 mm to 2 mm, preferably in the range 0.1 to 1 mm and most preferably in the range 0.1 to 0.5 mm.

The resin of the sacrificial layer may be the same or different to the resin of the core. Any suitable resin may be used for the resin of the core and sacrificial layer. Epoxy resin is particularly preferred for the resin in the core. The sacrificial layer may be formed from a resin that is less expensive than the resin in the core. For example, the sacrificial layer may be formed from vinylester resin.

The sacrificial resin layer may comprise a resin that is different to the resin in the core.

The sacrificial layer may be provided on mutually opposed first and second surfaces of the core.

The sacrificial layer may substantially cover the core of the strip.

The strip is preferably substantially rectangular in cross section. The strip preferably has a substantially constant cross section along its length. The core is preferably substantially rectangular in cross section. The core preferably has a substantially constant cross section along its length.

The strip preferably has a thickness in the range of 1 mm to 10 mm, for example in the range of 3 mm to 7 mm or approximately 5 mm and a width in the range of 5 cm to 30 cm, for example 10 cm to 20 cm.

The adherend surfaces are outer surfaces of the strip. The adherend surfaces are preferably substantially flat. The adherend surfaces are preferably defined by the length and width dimensions of the strip. The adherend surfaces may be bonded to similar surfaces of adjacent strips when the strips are arranged in a stack. The adherend surfaces may be rough (on a microscopic or molecular level) as a result of partial removal of resin from the sacrificial resin layer. The fibres may be any suitable fibres, for example carbon fibres and/or glass fibres. However, carbon fibres are preferred. The fibres are preferably unidirectional fibres, but other suitable fibres compatible with pultrusion may be used. For example, the fibres may be in the form of non-woven or woven fabric.

In an embodiment of the present invention, a spar cap for a wind turbine blade comprises a stack of pultruded strips integrated together. Each strip may be pultruded strip as described in relation to any of the embodiments above and/or made according to the process of any of the embodiments above.

An adherend surface of each strip of the spar cap may be bonded to an adherend surface of an adjacent strip in the stack by adhesive such as cured resin.

In a further embodiment, a wind turbine blade comprises the spar cap as described in the embodiments above.

BRIEF DESCRIPTION OF THE DRAWINGS

The present invention and further relevant background will now be described by way of non-limiting example, with reference to the accompanying figures in which:

FIG. 3B (i) shows an enlarged portion of part of the strip shown in FIG. 3A;

FIG. 3B (ii) shows the same portion of the strip shown in FIG. 3B (i) after removal of part of the sacrificial layer;

DETAILED DESCRIPTION

Figure 1A:
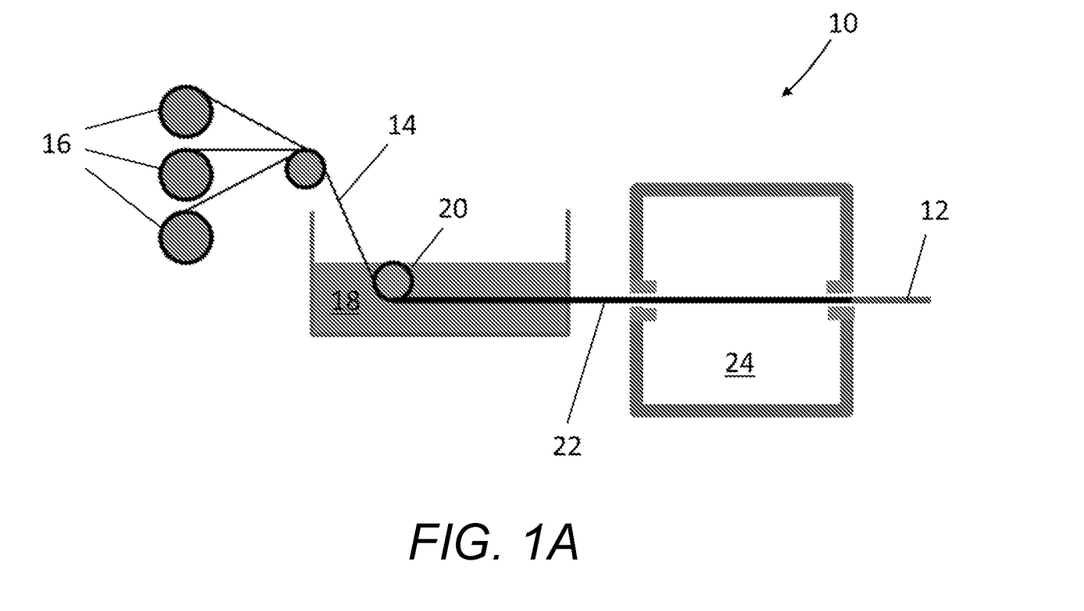
FIG. 1A is a schematic diagram of a known pultrusion process.

FIG. 1A illustrates a prior art pultrusion process 10 for making pultruded strips 12. In the process 10, carbon fibres 14 are pulled from at least one continuous reel 16. The fibres 14 are directed through a supply of liquid resin 18, such as a resin bath, by rollers 20 which maintain tension in the fibres 14. The resin-soaked fibres 22 are then pulled through a die 24 that forms the material into the final desired cross-sectional shape of the strip 12. The resin 18 is then cured, for example by heating in an open chamber or by employing heated dies that cure the resin as the strip 12 is passed therethrough.

Figure 1B:
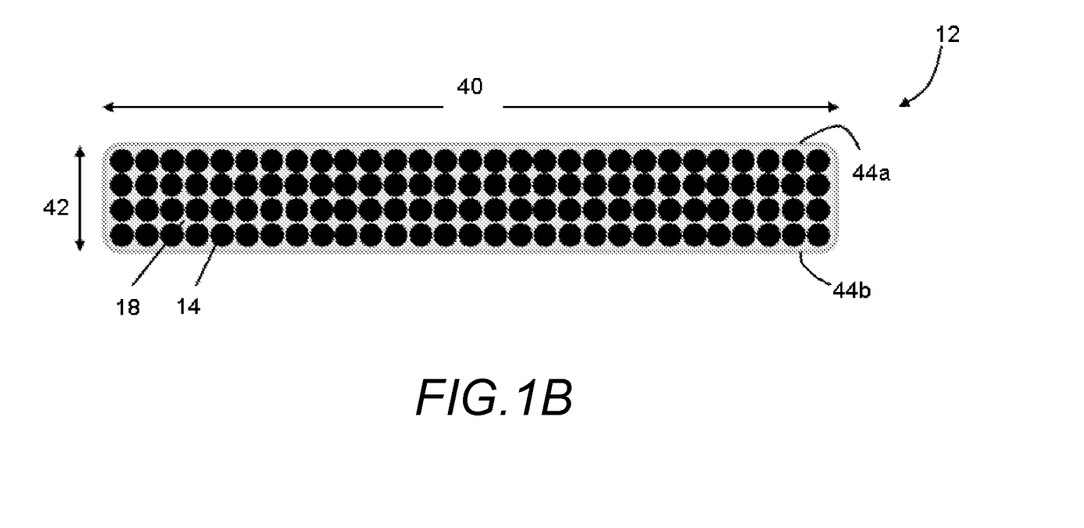
FIG. 1B shows a cross-section of a pultruded strip of the prior art.

FIG. 1B is a schematic cross-sectional view of a pultruded strip 12 formed by the known process 10 described above in relation to FIG. 1A. The strip 12 includes a plurality of carbon fibres 14 extending along the length of the strip 12 throughout the cross-section thereof. The fibres 14 are suspended in cured resin 18, which surrounds the fibres 14 and holds them together to form the profile shape of the strip 12.

The pultruded strip 12 has a generally rectangular cross-sectional shape having a width 40 and a thickness 42, wherein the width 40 is greater than the thickness 42. The strip 12 also has a length (not shown) extending perpendicular to the width 40 and thickness 42 directions. The length is greater than the width 40. The pultruded strip 12 has a substantially constant cross-sectional shape along its entire length.

The pultruded strip 12 comprises two opposing major surfaces 44a, 44b extending along the width 40 and length of the strip 12. Each major surface 44a, 44b functions as an adherend surface for bonding to an adherend surface of a similar strip when multiple strips are stacked and bonded together to form a laminate structure, such as a spar cap for a wind turbine blade.

Pultruded strips 12 (as shown in FIG. 1B or made by the process shown in FIG. 1A) tend to have a very smooth and flat outer surface. The smooth outer surface, which forms the adherend surfaces 44a, 44b, can result in a poor bond forming between adjacent bonded strips 12 in the laminate structure. If the adjacent strips 12 are not properly bonded together there is a risk of delamination occurring, which may lead to failure of the laminate, e.g. the spar cap in use.

In order to improve bonding between the strips 12, the adherend surfaces need to be 'activated' prior to bonding in order to optimise the chemical and mechanical properties thereof. Activating the adherend surfaces may involve altering the surface topography, for example by surface roughening, to provide improved bonding between the adherend surfaces.

One possible method of activating the adherend surfaces is by abrasion of the surfaces. However, it has been found that abrading the surfaces of pultruded strips 12 causes damage to the fibres 14 at or near the outer surface of the strip 12. The damaged fibres may reduce the structural integrity of the strip, and consequently may compromise the structural integrity of the final composite structure.

Figure 2A:
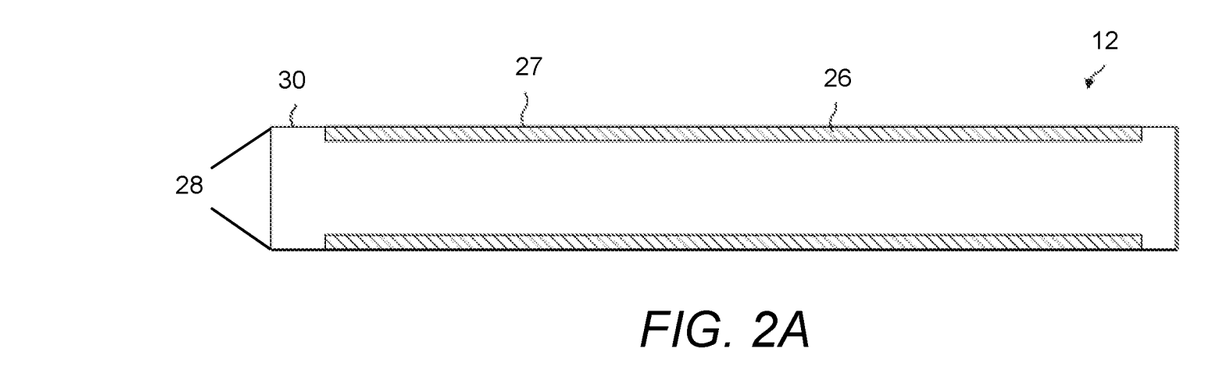
FIG. 2A shows a pultruded strip including a peel ply.
Figure 2B:
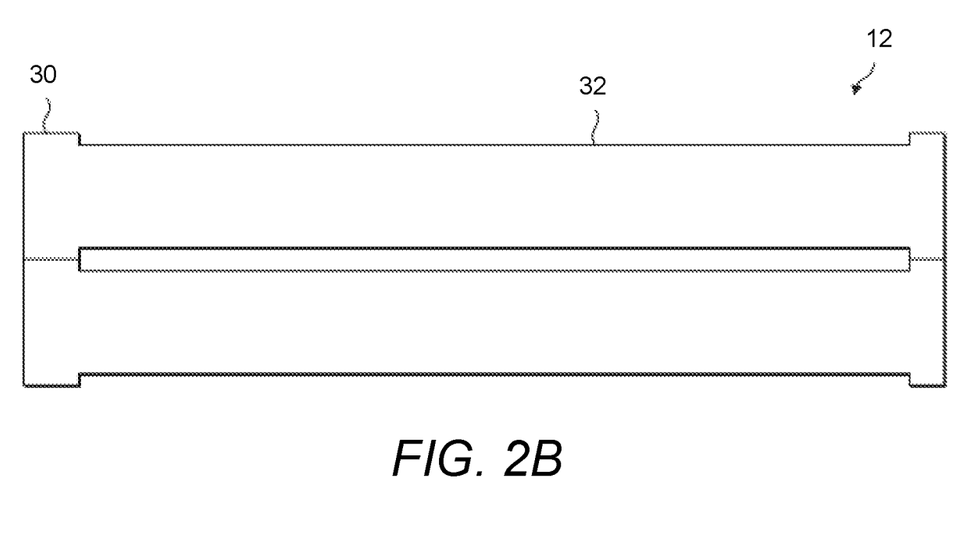
FIG. 2B shows two pultruded strips with peel plies removed.

Referring to FIG. 2A, another possible activation technique is the use of a peel ply 26 which may be formed onto the pultruded strip 12, and which can be removed to form a roughened surface 32 as shown in FIG. 2B. Such peel plies 26 are typically made of a woven fabric such as polyamide having the required surface topography for forming a sufficiently roughened surface 32. During the pultrusion process, the peel ply 26 is drawn through the die 24 together with the fibres 14 and the resin 18. The peel ply 26 is cured onto the surface of the strip 12 as the resin is cured and may subsequently be removed to create a roughened surface 32.

However, peel ply 26 presents challenges in both its application and removal. For example, when the peel ply 26 is held in tension on top of the strip 12, it has a tendency to fold or crease at its edges which creates ripples on the surface of the strip 12. The peel ply may cause fibre deviation in the strip 12 in the area around the ripples which compromises the mechanical properties of the strip 12. Also, the peel ply 26 may become caught in the machinery, e.g. the die, used in the pultrusion process. As such peel ply 26 that is narrower than the strip 12 is used so that it does not extend to the longitudinal edges 28 of the surface.

As shown in FIG. 2A, this narrower peel ply 26 may be positioned such that the edges of the ply 26 are spaced from the longitudinal edges 28 of the strip 12. A peripheral region 30 of the strip 12 is therefore left uncovered by the peel ply 26, as shown in FIG. 2A. This peripheral region 30 lies flush with the peel ply surface 27, so that when the peel ply 26 is removed, the peripheral region 30 lies above the roughened surface 32, as shown in FIG. 2B.

The absence of the peel ply 26 in the peripheral region 30 means that the peripheral region 30 is not roughened and therefore not activated or optimised for bonding. When the strips 12 are stacked, the peripheral regions 30 of neighbouring strips 12 contact one another. The mutually opposed smooth surfaces of the peripheral regions 30 of adjacent attached strips 12 means that poor bonding may occur between the peripheral regions 30 of the strips 12 which can lead to delamination. Moreover, consistency in the spacing at the edges of the strips 12 can be difficult to replicate in the process often resulting in variation in the size of peripheral regions 30 between the strips 12 and therefore inconsistency in bonding between strips 12.

The use of peel ply 26 also increases the risk that residues of the peel ply 26 may be left stuck on the strip after removal of the peel ply 26, which may contaminate and compromise bonding between the strips 12. The use of peel ply 26 also adds significant cost to the pultrusion process.

Figure 3A:
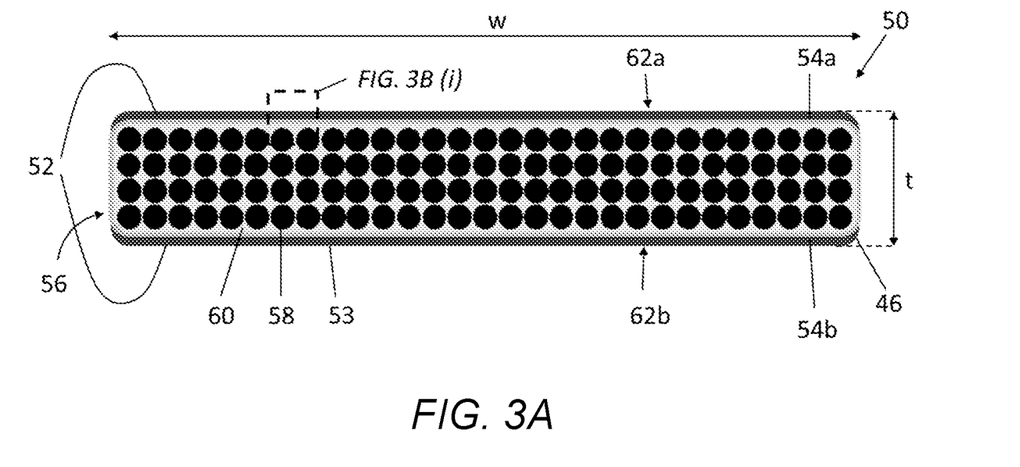
FIG. 3A shows a cross-section of a pultruded strip comprising a sacrificial layer in accordance with an embodiment of the present invention.

FIG. 3A is a schematic cross-sectional view of a pultruded strip 50 according to an embodiment of the present invention As will be discussed in more detail below, the strip 50 is similar to the strip 12 described above, but further includes sacrificial layers 52, which can be activated (e.g. by abrasion) without damaging the fibres 14 in the strip 50.

The pultruded strip 50 in this example has a generally rectangular cross-sectional shape having a width w and a thickness t, wherein the width w is greater than the thickness t. The strip 50 also has a length l (not shown) extending perpendicular to the width w and thickness t directions (e.g. perpendicular to the plane of the page showing FIG. 3A). The length is greater than the width w. The pultruded strip 50 has a substantially constant cross-sectional shape along its entire length.

The strip 50 has a core 56, which includes a plurality of fibres 58 (e.g. carbon fibres), disposed in a hardened matrix material 60 (e.g. cured resin). The matrix 60 surrounds the fibres 58 and holds them together to form the profile shape of the core 56. The core 56 has first and second major surfaces 54a, 54b, which in the orientation of the strip 50 shown in FIG. 3A are upper and lower surfaces respectively of the core 56. The strip 50 further includes two sacrificial layers 52, one on each of the opposing major surfaces 54a, 54b of the core 56. In this example, the strip 50 has rounded or chamfered longitudinal edges 46.

It will be appreciated that the core 56 of the strip 50 in this example generally corresponds to the entire strip 12 described by way of background with reference to FIG. 1B.

In particular embodiments, the thickness t of the strip 50 is within the range of 1 mm to 10 mm, for example in the range of 3 mm to 7 mm or approximately 5 mm. The width w of the strip 50 may be in the range of 10 cm to 20 cm, for example. The length l of the strip 50 may be tens of metres. When the strip 50 is used to form a spar cap for a wind turbine blade it may have a length in excess of 50 metres, or in excess of 80 metres for some of the largest blades. Alternatively, the length l of the strip 50 may be much shorter such that a plurality of strips 50 are laid end to end to form a spar cap of the desired length.

The fibres 58 in the core 56 are packed tightly together to provide the required fibre volume fraction within the core 56. In some embodiments the core 56 may have a fibre volume fraction of at least 50%, for example at least 60% or 70%. The matrix 60 may comprise a resin material such as epoxy resin.

The material forming the sacrificial layers 52 may comprise a resin material 53 such as vinylester or epoxy resin. The sacrificial layers 52 may comprise substantially the same resin as used for the matrix 60 forming the core 56 of the strip 50 or may be different. In embodiments where the sacrificial layers 52 comprise a different material to the matrix 60, the sacrificial layers 52 may be chemically compatible with the matrix 60 of the core 56 such that an effective bond can be formed therebetween.

In embodiments, the matrix 60 forming the core 56 of the strip 50 comprises an epoxy resin and the sacrificial layers 52 comprise a vinylester resin, which is chemically compatible with the epoxy resin of the matrix 60 such that an effective bond can be created therebetween. The use of epoxy resin for the matrix 60 may provide optimum structural properties of the strip 50 while the use of vinylester, which is typically cheaper than epoxy, for the sacrificial layer 52 may reduce the cost of the strip 50 in comparison to a strip having a sacrificial layer 52 made of epoxy.

The sacrificial layers 52 are positioned on each of the mutually opposed major surfaces 54a, 54b of the core 56, such that they each extend substantially the entire width and length of the strip 50. The sacrificial layers 52 therefore extend over and cover the major surfaces 54a, 54b and at least a portion of the rounded edges 46 of the strip 50. Each of the two sacrificial layers 52 has a substantially uniform width and thickness across the length and width of the strip 50. The two sacrificial layers 52 also have substantially the same thickness as each other in this example.

In other embodiments, rather than forming two distinct layers 52, the entire core 56 may be covered by a sacrificial layer.

The sacrificial layer(s) 52 define adherend surfaces 62a, 62b of the strip 50. When the strip 50 is produced, these adherend surfaces 62a, 62b may initially be smooth and have a glass-like finish. It has been explained by way of background that such smooth surfaces are not optimal for forming strong bonds between stacked strips.

In order to provide optimal adherend surfaces 62a, 62b that result in strong bonding between strips 50, the sacrificial layer(s) 52 may be activated by removing at least a portion of the layer 52. For example, the adherend surfaces 62a, 62b of the sacrificial layer(s) 52 may be abraded to remove resin from these surfaces. Activation of the sacrificial layer(s) 52 serves to roughen the adherend surfaces 62a, 62b (at least on a microscopic or molecular level). Advantageously, the core 56 is not affected when the sacrificial layers 52 are activated, and hence no damage is caused to the fibres 58 in the strip 50. Also, the sacrificial layers 52 may be abraded over the entire outer surfaces of the strip 50, thus avoiding the problems described above associated with peel ply, where the edges of the strip are not activated.

Figure 3B:
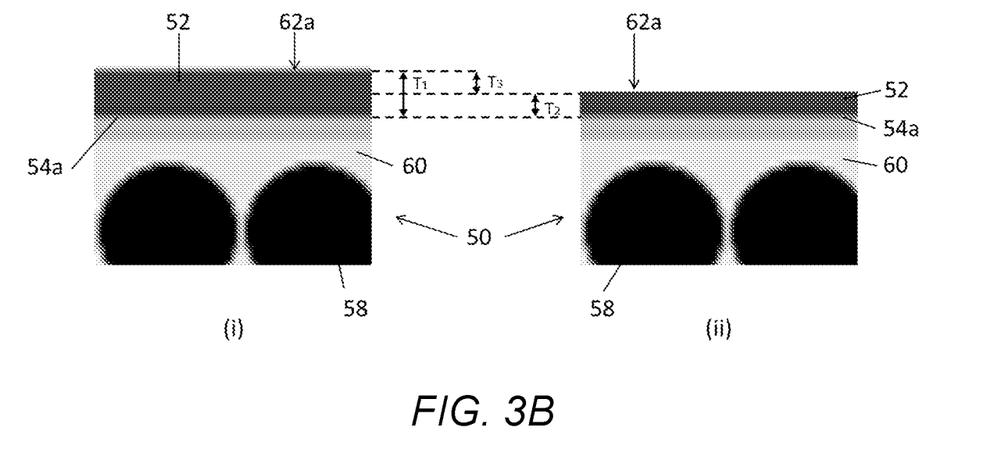

FIG. 3B shows an enlarged portion of the strip 50 shown in FIG. 3A before (i) and after (ii) activation of the sacrificial layer 52. Referring to FIG. 3B (i), prior to activation, the sacrificial layer 52 has a thickness $T_1$. At this stage, the adherend surface 62a defined by the sacrificial layer 52 may have a smooth glass-like finish.

Referring now to FIG. 3B (ii), after activation of the sacrificial layer 52, e.g. after some resin has been removed from the sacrificial layer 52 by abrasion of the adherend surface 62a, the sacrificial layer 52 has a thickness $T_2$. After activation, the adherend surface 62a may have a rougher surface (at least on a microscopic level).

The thickness of the sacrificial layer 52 removed during activation is indicated as $T_3$ in FIG. 3B. The thickness $T_2$ of the sacrificial layer 52 after activation corresponds to the thickness $T_1$ of the sacrificial layer 52 before activation less the thickness $T_3$ that has been removed (i.e. $T_2=T_1-T_3$). It can be seen from a comparison of FIGS. 3B and 3C that activation of the sacrificial layer 52 causes a reduction in the thickness of the sacrificial layer (hence $T_2<T_1$).

In embodiments, prior to activation the thickness $T_1$ of the sacrificial layer(s) 52 may be less than 2 mm, for example less than 1 mm or less than 0.5 mm thick. Preferably the thickness $T_1$ of the sacrificial layer(s) 52 prior to activation is in the range of 0.1 to 0.5 mm, for example 0.2 mm. Any suitable thickness $T_3$ of the sacrificial layer(s) 52 may be removed during activation. In order to avoid damaging the fibres 58 in the core 56, it is preferable not to remove the entire sacrificial layers(s) 52 (hence $T_3$ should be less than $T_1$). The thickness $T_2$ of the sacrificial layer(s) 52 after activation may be between 0.1 mm and 1 mm, for example. In embodiments where the sacrificial layer 52 has an initial thickness $T_1$ of about 0.2 mm, the thickness $T_2$ of the sacrificial layer 52 may be about 0.1 mm after activation thereof. In embodiments requiring a greater level of tolerance, for example when using manual activation methods, the initial thickness $T_1$ of the sacrificial layer 52 may be about 2 mm and the thickness $T_2$ of the sacrificial layer may be about 1 mm after activation.

The sacrificial layer(s) 52 are therefore intended to be at least partially removed from the strip 50 (e.g. by abrasion or other suitable technique) prior to the incorporation of the strip 50 into a laminate composite, e.g. a spar cap or wind turbine blade.

Figure 3C:
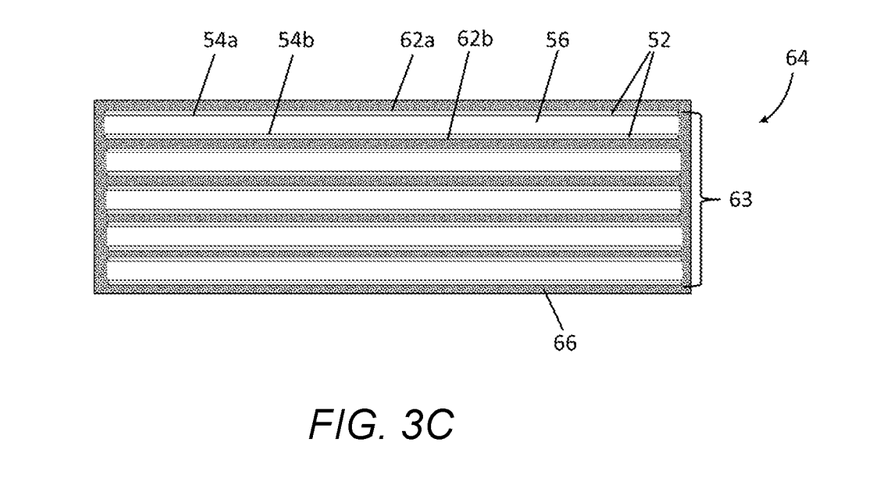
FIG. 3C is a schematic cross-sectional view of a spar cap comprising a stack of bonded strips according to an embodiment of the present invention.

Referring now to FIG. 3C, this shows (schematically) a plurality of pultruded strips 50 according to an embodiment of the invention arranged in a stack 63 and bonded together to form a spar cap 64 for a wind turbine blade. Each strip 50 in this example corresponds to the strip shown and described with reference to FIG. 3A after activation of the sacrificial layers 52 (e.g. as shown in FIG. 3B (ii)). Accordingly, part of the sacrificial layers 52 of each strip 50 has been removed, for example by abrasion or other technique to form activated adherend surfaces 62a, 62b.

The stacked strips 50 are bonded together by an adhesive 66, in this case a resin such as epoxy resin. The strips 50 are arranged in the stack 63 with their respective adherend surfaces 62a, 62b in mutually opposed relation. The adhesive 66 may be applied directly to the adherend surfaces 62a, 62b of the strips 50, or via another technique such as a resin infusion process. In an infusion process, liquid resin is supplied to the stack 63, and the resin infuses between the opposed adherend surfaces 62a, 62b of the strips 50.

Activation of the sacrificial layers 52 exposes more resin at the adherend surfaces 62, 62b of the strips 50 and results in an intimate molecular contact between the bonding adhesive 66 and adjacent adherend surfaces 62a, 62b of the stacked strips 50. Once cured, the adhesive 66 therefore forms a strong bond between the strips 50, which resists delamination.

It will be appreciated that FIG. 3C is not to scale, and in reality the sacrificial layers 52 and spaces between strips 50 would be smaller than they appear in the figure. For the avoidance of doubt, the other figures presented herein are also not intended to be to scale.

The spar cap 64 shown in FIG. 3C may be formed in situ with a wind turbine blade, for example by stacking the activated pultruded strips 50 in a wind turbine blade mould together with other blade materials and infusing the entire layup with a resin. Alternatively, the spar cap 64 could be formed as a separate component, and may subsequently be incorporated into a wind turbine blade layup.

Figure 4:
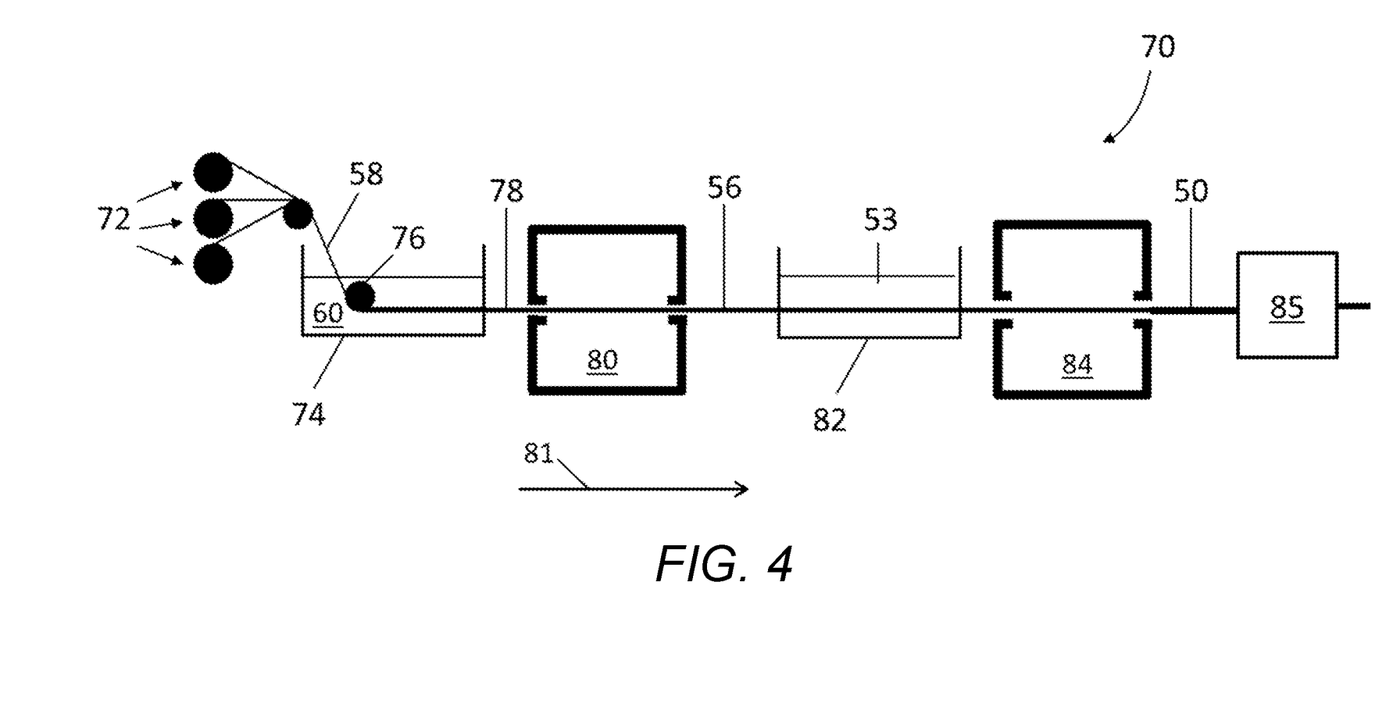
FIG. 4 shows a modified pultrusion process in accordance with an embodiment of the present invention.

FIG. 4 shows an example apparatus 70 for manufacturing a pultruded strip 50 in accordance with the present invention. The apparatus 70 includes a plurality of endless reels 72 of carbon fibres 58 and a drawing device (not shown) pulling the fibres 58 from the reels 72 in a process direction 81. The fibres 58 are directed by tension rollers 76 into a bath 74 containing liquid resin for forming a matrix 60 in the same way as described in relation to FIG. 1 above. The resin-soaked fibres 78 are then pulled through a die 80. The cross section of the die 80 controls the cross-section of the strip core 56 that is formed by the pultrusion process. The die 80 may comprise lower and upper moulding surfaces that mould the major surfaces 54a, 54b of the core 56. In embodiments, the die 80 may be rectangular to form a pultruded core 56 having a rectangular cross section.

The die 80 may also be heated in order to partially cure the matrix material 60. Additionally or alternatively the fibres 58 and matrix 60 forming the core 56 may then be directed into an oven for partial curing, for example an oven in line with the pultrusion die 80.

The core 56 comes out of the die 80 with the intended design shape and fibre count. From this point onwards the sacrificial layers 52 are added to the core 56.

After the first die 80, the core 56 may not be fully cured but may be partially cured. The sacrificial layer 52 is then applied at an application station 82. In the embodiment of FIG. 4, a second resin bath 82 containing a further resin is positioned downstream of the die for application of the sacrificial layer 52. The second resin bath 82 may be similar to the first resin bath 74 containing the resin for the matrix 60. A second die 84 may then be positioned downstream of the second resin bath 82 for shaping the strip 50. In embodiments, the second bath 82 may be spaced a suitable distance from and/or below the output of the first die 80 to allow for bending of the core 56 into the second bath 82.

If required, the pultruded strip 50, with the sacrificial layers 52 applied to its major surfaces 54*a*, 54*b*, may be subsequently moved to a curing oven, where the pultruded strip 50 is further heated to fully cure the strip 50, thereby bonding the sacrificial layers 52 to the major surfaces 54*a*, 54*b* of the core 56. The curing oven may form part of the pultrusion apparatus, for example it may be provided in line with the pultrusion die or may be integral with the pultrusion die. Once the resin in the core 56 and sacrificial layers 52 has cured, the strip 50 may then correspond to the strip 50 shown in FIG. 3A.

As just described, the core 56 is not fully cured but is partially cured before it enters the second resin bath 82. By curing the matrix 60 only partially, rather than fully curing, a better bond may be achieved between the matrix 60 and the sacrificial layer 52. However, it is also possible for the core 56 to be fully cured before it enters the second resin bath 82.

An activation station 85 for surface treatment of the strip 50 may be positioned downstream of the curing oven (if present). The exact activation method used will depend on the surface properties of the strips 50 and adhesive used.

One particular activation technique is roughening of the surface of the strip 50 using abrasive materials to remove unwanted layers and generate a roughened surface texture. Such mechanical abrasion will remove weak boundary layers. It will also change the surface topography of the adherend surfaces 62*a*, 62*b* of the sacrificial layers 52, increasing the bondable surface area of the strip 50 on a micro scale. Furthermore, mechanical abrasion may enhance the ability of the adhesive 66 (shown in FIG. 3C) to 'wet' the adherend surfaces 62*a*, 62*b*, i.e. when the adhesive 66 readily and completely covers these surfaces 62*a*, 62*b*.

In embodiments, the strip 50 may be abraded using silicon carbide paper or other abrasive materials. The resulting topography of the adherend surfaces 62*a*, 62*b* obtained with the abrasive can be controlled by modification of the grit size or by the time and/or pressure of the abrasive on the surfaces 62*a*, 62*b*, for example by automating the activation as opposed to manual sanding of the surfaces 62*a*, 62*b*.

Another method of activation by surface roughening is by blasting the surfaces 62*a*, 62*b* for example by grit blasting, cryoblast or sodablast. The type of blasting particle used, the particle size, pressure of blast, exposure time, angle of blast and distance between blast nozzle and adherend surfaces 62*a*, 62*b* can be varied depending on the required surface finish.

Alternatively or additionally, energetic surface pre-treatments may be used to activate the adherend surfaces 62*a*, 62*b* of the strips 50. For example flame, corona discharge and plasma (FCDP) and excimer laser. Such procedures may cause a change in the surface texture of the adherend surfaces 62*a*, 62*b*.

Activation of the sacrificial layer(s) 52 of the strips 50 may take place in line with the pultrusion process as an extension thereof. Alternatively, the strips 50 may be activated at a later stage and/or at a separate location to the pultrusion process. In particular embodiments, the strips 50 are activated immediately prior to bonding to each other. For example, the strips 50 may be activated less than 12 hours or less than 6 hours before bonding to avoid contamination of the adherend surfaces 62*a*, 62*b*.

The pultruded strip 50 may be cut into individual elongate strips of the length required to form a spar cap or other elongate reinforcing structure. Cutting of the strip 50 may be performed before or after activation of the sacrificial layer 52. The cutting may be performed in line with the pultrusion process or may be performed at a separate location. For example, the strips 50 may be assembled in large rolls for cutting and/or activation at a location remote from the pultrusion process.

It will be appreciated that the sacrificial layer 52 need not be applied using a resin bath 82 as described above. Instead the sacrificial layer 52 could be applied downstream of the first die 80 by rollers (for example) which can give an accurate thickness of applied resin 53. The sacrificial layer 52 could then cure without passing through a second die 84. In embodiments, the application station comprises two roller systems, one arranged above the pultruded core 56 and one arranged below the pultruded core 56. The roller systems store the sacrificial layer 52, and apply the material 53 to the opposing major surfaces 54*a*, 54*b* (upper and lower surfaces) of the pultruded core 56 respectively.

In alternative embodiments the application station comprises a resin sprayer. For example, two resin sprayers may be arranged such that one of the sprayers is above and the other below the pultruded core 56 or any other arrangement that allows the sacrificial layer 52 to be sprayed evenly onto the major surfaces 54*a*, 54*b* of the core 56.

Figure 5:
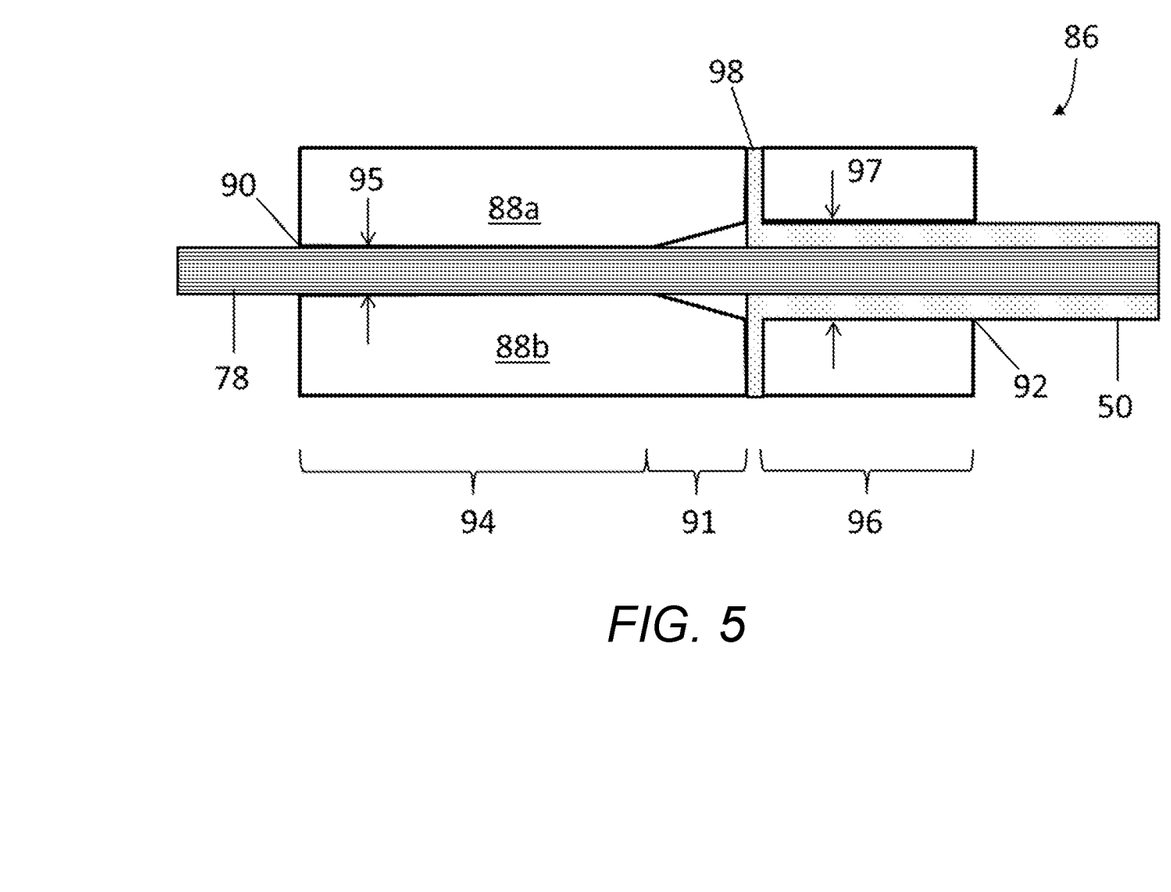
FIG. 5 shows a modified pultrusion die in accordance with an embodiment of the present invention.

In other embodiments, the application station may be integral with the core pultrusion die. FIG. 5 shows a cross-sectional view of a pultrusion die 86 incorporating an application station in accordance with an embodiment of the invention. The die 86, which is positioned downstream of a resin bath, includes upper and lower surfaces 88*a*, 88*b* (which in this example are defined by plates) extending between a die inlet 90 and a die outlet 92.

A first portion 94 of the die 86 shapes the resin soaked fibres 78 to form the core 56 of the strip 50. In the first portion 94, the upper and lower surfaces 88*a*, 88*b* are spaced from each other by a first distance 95 perpendicular to the process direction and substantially equal to the desired thickness of the core 56. A second portion 96 of the die 86 shapes the whole strip 50, including the sacrificial layers 52. In the second portion 96, the upper and lower surfaces 88*a*, 88*b* form mutually opposed surfaces that are spaced from each other by a second distance 97 also perpendicular to the process direction. The second distance 97 is greater than the first distance 95 and substantially equal to the desired thickness t (see FIG. 3A) of the final strip 50 prior to activation of the sacrificial layers 52.

A resin inlet port 98 is arranged between the first and second portions 94, 96 of the die 86 in order to apply the sacrificial layer 52 to the strip 50 downstream of the fibre inlet 90. The die 86 further includes a transition portion 91 extending between the first portion 94 and the resin inlet port 98 in which the spacing between the upper and lower plates 88*a*, 88*b* gradually increases from the first distance 95 to the second distance 97.

As such, resin-soaked fibres 78 enter the die 86 at the inlet 90 and are shaped and partially or fully cured in the first portion 94 to form the core 56. Additional resin 53 is applied to the core 56 from the resin inlet 98 and the sacrificial layers 52 are shaped and partially or fully cured onto the core 56 in the second portion 96 such that a strip 50 having sacrificial layers 52 as described in relation to FIG. 3A above is produced at the outlet 92.

The die 86 may be heated such that the resin forming the matrix 60 of the core 56 is at least partially cured by the time it reaches the sacrificial resin inlet port 98. Partially curing the matrix 60 in this way may improve the mechanical properties of the core 56 and therefore improve the mechanical properties of the resulting strip 50. For example partial curing may help ensure the core 56 retains the requisite fibre density during application of the sacrificial layer 52. By curing the matrix 60 only partially, rather than fully curing, a better bond may be achieved between the matrix 60 and the sacrificial layer 52.

The above described modification to the pultrusion process results in a strip 50 having a core 56 containing structural fibres 58 as well as sacrificial layers 52 on an outer surface of the core 56, which enables subsequent surface activation of the strip 50 to be carried out without damaging the fibres 58 of the core 56. Activation may result in a strip having a rough surface (at least on a microscopic or molecular level) which improves the bonding properties thereof.

Figure 6:
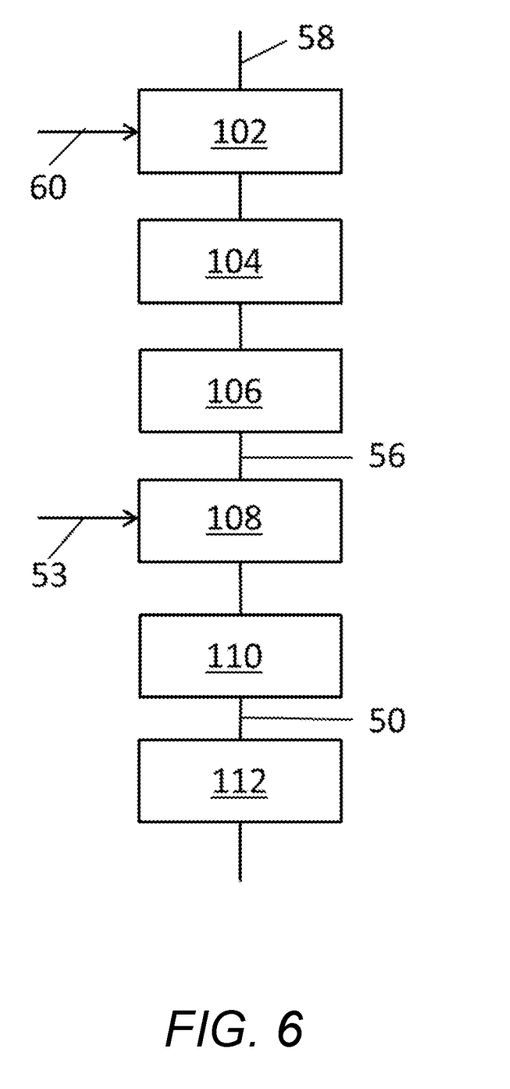
FIG. 6 is a flow diagram of a process in accordance with an embodiment of the present invention.

FIG. 6 shows a flow diagram of a process for making a strip 50 in accordance with an embodiment of the present invention. The process comprises a number of stages 102, 104, 106, 108, 110, 112 during which a strip 50 according to the invention is formed.

At stage 102, dry fibres 58, such as the carbon fibres of the embodiments described above, are combined with a material, such as a resin, suitable for forming a matrix to hold the fibres together.

The fibres and matrix material are then shaped at stage 104, for example in a die, to form a desired core profile.

At stage 106, the core may be at least partially cured by the addition of heat. The core 56 may be partially cured in the die, for example by providing a heated die, or may be cured in a curing oven positioned downstream of the die.

At stage 108, further material is added to at least one major surface of the core to form a sacrificial layer suitable for subsequent activation. The further material is added at an application station which could be a second resin bath, rollers, spray nozzles or could be integral with the first die as described in relation to any of the embodiments above.

At stage 110, the strip is then fully cured in order to bond the sacrificial layer 52 to the matrix material 60 thereby forming a strip 50 that can be effectively activated without damage to the core fibres. This may involve directing the strip 50 through a curing oven provided downstream of the pultrusion die, or the pultrusion die may be heated or otherwise configured to cure the matrix material 60.

At stage 112 the strip 50 is activated at an activation station in order to improve the bonding properties of the strip 50. Activation may involve removal of at least some of the sacrificial layer 52 by any of the methods described above. The activation station may be provided in-line with the pultrusion die(s).

After activation, the strip 50 is then cut into a plurality of smaller strips such that they can be bonded to one another to form a reinforcing structure for a wind turbine. The strip 50 may be cut before or after activation thereof. The strip 50 might be assembled in rolls for cutting at another location.

Generally, the process includes pulling fibres through a number of stations relating to each of the stages mentioned above. A matrix material is added, shaped and at least partially cured in order to form a core. A sacrificial layer is added and cured onto the core to form a strip 50 according to the invention.

As such the present invention provides a strip and a process for making such a strip that may be activated to improve its bonding properties. As activation can be performed on the sacrificial layer only, the activation equipment need not come into contact with the core containing the structural fibres. As such the strip may be activated over an entire major surface thereof without damage to the structural fibres therein, thereby overcoming the problems associated with existing pultruded strips as described above.

Although the above described embodiments include carbon fibres, it will be appreciated that any reinforcing fibres might be incorporated into the core to provide the required structural properties thereof.

Furthermore, it will be appreciated that the strip or core may have alternative shapes and dimensions to those shown or described in relation to the embodiments above. For example, the strip may or may not include rounded longitudinal edges or may have a curved cross-sectional profile that allows the stacking of multiple strips as described above. As such, other die shapes may be used depending on the geometry required for the spar cap or other load-bearing element.

The sacrificial layer of the invention may be disposed on only one of the major surfaces of the strip, on both major surfaces of the strip or could completely surround the strip depending on the application method.

The thickness of the sacrificial layer can be adjusted by specifying the design of the die, for example, and can be chosen to suit the surface activation method that may subsequently be adopted to abrade the layer and provide the required surface texture. Also the type of resin to be used for the sacrificial layer can be selected to be cheaper than the resin in the main core of the pultruded element.

The sacrificial layers 52 may comprise a resin material such as those discussed in the embodiments above such that the sacrificial layers 52 may confer little or no load-bearing properties to the strip 50. The sacrificial layer 52 is substantially devoid of continuous structural fibres such as the continuous carbon fibres 58 of the core 56 but may (if required) include other fibres or additives which may be added to the sacrificial layer 52 prior to application onto the core 56. In embodiments, the sacrificial layers 52 have a fibre volume fraction of less than 5%. For example, in a preferred embodiment the sacrificial layer has a fibre volume fraction of 0%.

Many resin types may be used in the pultrusion process of the invention, including but not restricted to vinylester and epoxy resins. The process may include using a different resin material to form the sacrificial layer than used in the initial pultrusion for forming the matrix. For example, epoxy resin could be used for the matrix material to provide optimum structural properties of the strip while vinylester could be used for the sacrificial layer to reduce the cost thereof. It will be appreciated that alternative materials, such as alternative resins, could also be used.

The strip may be formed substantially entirely of resin and fibres however other additives may be present depending on the required properties of the strip.

A spar cap or other elongate reinforcing structure may be made by stacking the strips 50, as described above, and carrying out a resin infusion process in a mould tooling. The resulting spar cap or other elongate reinforcing structure may then be integrated into a wind turbine blade. In other embodiments, the strips may be stacked directly in a mould for a blade half with other structural components of the blade, and the resin infusion process may be applied to the entire blade half, such that the spar cap is both formed and integrated into the blade half simultaneously.

Figure 7:
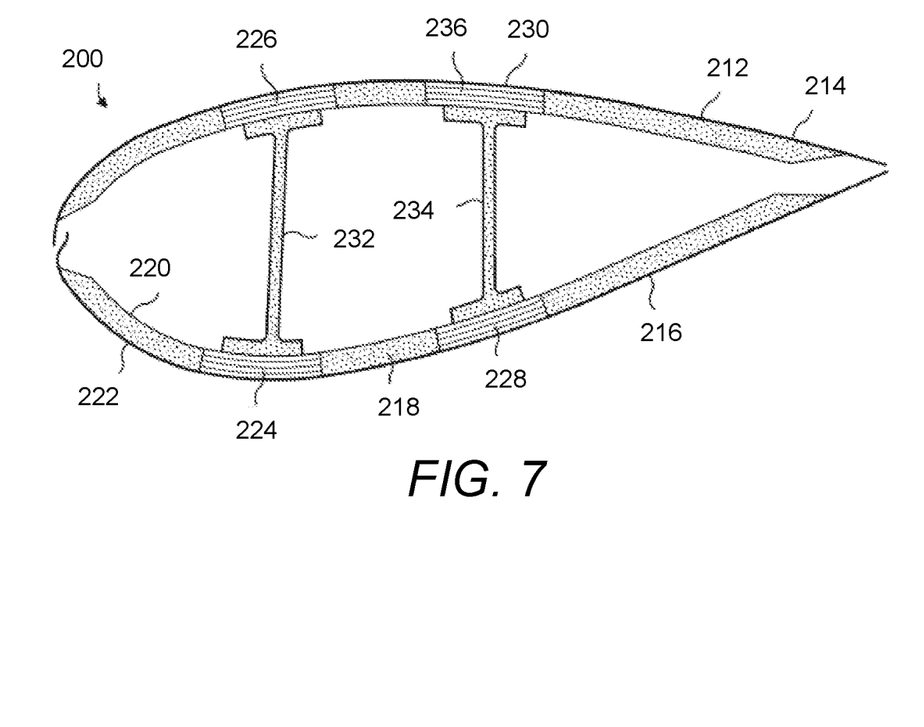
FIG. 7 shows a cross-sectional view of a wind turbine blade having spar caps in accordance with the invention.

FIG. 7 is a cross-sectional view of a wind turbine rotor blade 200 having a plurality of spar caps 224, 226, 228, 230. The blade 200 has an outer shell 222, which is fabricated from two half shells 214, 216. The shells 214, 216 are moulded from glass-fibre reinforced plastic (GRP). Parts of the outer shell 222 are of sandwich panel construction and comprise a blade core of lightweight foam (e.g. polyurethane), which is sandwiched between inner and outer GRP layers or 'skins'.

The blade comprises first and second pairs of spar caps 224, 226, 228, 230 arranged between sandwich panel regions of the outer shell 222. One spar cap of each pair is integrated with the windward shell and the other spar cap of each pair is integrated with the leeward shell. The spar caps 224, 226, 228, 230 of the respective pairs are mutually opposed and extend longitudinally along the length of the blade 200. A first longitudinally-extending shear web 232 bridges the first pair of spar caps 224, 226 and a second longitudinally-extending shear web 234 bridges the second pair of spar caps 228, 230. The shear webs 232, 234 in combination with the spar caps 224, 226, 228, 230 form a pair of I-beam structures, which transfer loads effectively from the rotating blade 200 to the hub of the wind turbine (not shown). The spar caps 224, 226, 228, 230 in particular transfer tensile and compressive bending loads, whilst the shear webs 232. 234 transfer shear stresses in the blade 200.

Each spar cap 224, 226, 228, 230 has a substantially rectangular cross section and is made up of a stack of pultruded strips 50 as described above. The number of strips 50 in the stack depends upon the thickness of the strips 50 and the required thickness of the shell, but typically there may be between four and twelve strips 50 in the stack.

The wind turbine blade 200 shown in FIG. 7 is made using a resin-infusion (RI) process, whereby the various laminate layers of the shell are laid up in a mould cavity, and a vacuum is applied to the cavity. Resin is then introduced to the mould, and the vacuum pressure causes the resin to flow over and around the laminate layers and to infuse into the interstitial spaces between the layers. To complete the process, the resin-infused layup is cured to harden the resin and bond the various laminate layers together to form the blade 200.

The present invention is therefore not limited to the exemplary embodiments described above and many other variations or modifications will be apparent to the skilled person without departing from the scope of the present invention as defined by the following claims.

The invention claimed is:

1. A pultrusion process for making a pultruded strip suitable for stacking with one or more similar strips to form a spar cap for a wind turbine blade, the process comprising:

drawing resin-coated reinforcing fibres through a pultrusion die in a process direction to form a core of the strip;

applying further resin to one or more surfaces of the core to form a sacrificial resin layer defining an adherend surface of the strip; and removing resin from the sacrificial layer through a surface treatment process to activate the adherend surface.

2. The pultrusion process of claim 1, further comprising at least partially curing the resin in the core of the strip before applying the further resin.

3. The pultrusion process of claim 1, comprising applying the further resin downstream of the pultrusion die in the process direction.

4. The pultrusion process of claim 1, wherein the method comprises drawing the core with the applied further resin through a further pultrusion die to form the strip into a final cross-sectional shape.

5. The pultrusion process of claim 1, further comprising shaping the core of the strip in a first portion of the die and shaping the core and sacrificial layer in a second portion of the die, wherein the method comprises applying the further resin to the core within the die between the first and second portions of the die.

6. A pultruded strip of reinforcing material for stacking with one or more similar strips to form a spar cap for a wind turbine blade, the pultruded strip comprising:

a core comprising fibres disposed in a resin matrix; and a sacrificial layer at least partially covering one or more surfaces of the core, wherein the sacrificial layer is a resin layer defining an adherend surface of the strip; and wherein the sacrificial layer has an activated adherend surface formed by using a surface treatment process to remove resin from the sacrificial layer.

7. The pultruded strip of claim 6, wherein the sacrificial layer is substantially devoid of fibres.

8. The pultruded strip of claim 6, wherein the sacrificial layer has a thickness in the range of 0.1 mm to 2 mm.

9. The pultruded strip of claim 6, wherein the sacrificial resin layer comprises a resin that is different to the resin in the core.

10. The pultruded strip of claim 6, wherein the sacrificial layer is provided on mutually opposed first and second surfaces of the core.

11. A spar cap for a wind turbine blade, the spar cap comprising a stack of pultruded strips integrated together, wherein each strip is a pultruded strip as claimed in claim 6.

12. The spar cap of claim 11, wherein an adherend surface of each strip is bonded to an adherend surface of an adjacent strip in the stack by adhesive such as cured resin.

13. A wind turbine blade comprising the spar cap claim 12.

14. The pultrusion process of claim 1, wherein the surface treatment process includes at least one of an abrasion process, a blasting treatment process, or an energetic surface treatment process.

15. The pultrusion process of claim 1, wherein the one or more surfaces to which the resin is applied extend an entire width of the strip.

16. The pultrusion process of claim 15, wherein the one or more surfaces that extend the entire width of the strip are planar surfaces.

* * * * *